United States Patent
Kobayashi et al.

(10) Patent No.: US 12,494,533 B2
(45) Date of Patent: Dec. 9, 2025

(54) BATTERY CASE AND METHOD OF PRODUCTION OF SAME

(71) Applicant: NIPPON STEEL CORPORATION, Tokyo (JP)

(72) Inventors: Akinobu Kobayashi, Tokyo (JP); Koichi Nose, Tokyo (JP); Yasuto Goto, Tokyo (JP); Takehiro Takahashi, Tokyo (JP); Tatsuo Nagata, Tokyo (JP); Masaharu Ibaragi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 694 days.

(21) Appl. No.: 17/608,418

(22) PCT Filed: Jun. 10, 2020

(86) PCT No.: PCT/JP2020/022919
§ 371 (c)(1),
(2) Date: Nov. 2, 2021

(87) PCT Pub. No.: WO2020/250950
PCT Pub. Date: Dec. 17, 2020

(65) Prior Publication Data
US 2022/0216548 A1  Jul. 7, 2022

(30) Foreign Application Priority Data
Jun. 10, 2019  (JP) .................. 2019-107770

(51) Int. Cl.
*H01M 50/124* (2021.01)
*H01M 50/103* (2021.01)
(Continued)

(52) U.S. Cl.
CPC ....... *H01M 50/124* (2021.01); *H01M 50/103* (2021.01); *H01M 50/15* (2021.01);
(Continued)

(58) Field of Classification Search
CPC ........... H01M 2220/20; H01M 50/124; H01M 50/103; H01M 50/164; H01M 50/15; H01M 50/169
See application file for complete search history.

(56) References Cited

U.S. PATENT DOCUMENTS

2015/0030912 A1  1/2015  Nose et al.

FOREIGN PATENT DOCUMENTS

JP   2004-342564 A   12/2004
JP   2010-86744 A    4/2010
(Continued)

*Primary Examiner* — Jonathan G Leong
*Assistant Examiner* — Kan Luo
(74) *Attorney, Agent, or Firm* — Birch, Stewart, Kolasch & Birch, LLP

(57) ABSTRACT

A battery case and method of production of the same realizing smaller size, higher mountability, longer service life, and lower cost than in the past, that is, a battery case comprising a container body and a container cover, in which battery case, one or both of the container body and the container cover are made from a laminated steel sheet comprised of a plated steel sheet on which a film having a polyolefin-based resin as a main constituent is laminated, a joined part of the container body and the container cover has a welded part of the plated steel sheet, a melt bonded part of the film, and a gap part between the welded part and the melt bonded part, where a length of gap part/thickness of plated steel sheet ≤10.0 and a length of gap part/length of joined part <0.50, and at least part of the inside surface of the battery case is covered by the film, and a method of production of the same.

19 Claims, 3 Drawing Sheets

(51) Int. Cl.
    *H01M 50/15*        (2021.01)
    *H01M 50/164*     (2021.01)
    *H01M 50/169*     (2021.01)

(52) U.S. Cl.
    CPC ....... *H01M 50/164* (2021.01); *H01M 50/169* (2021.01); *H01M 2220/20* (2013.01)

(56) References Cited

FOREIGN PATENT DOCUMENTS

| | | |
|---|---|---|
| JP | 2011-60844 A | 3/2011 |
| JP | 2013-184290 A | 9/2013 |
| WO | WO 2013/132673 A1 | 9/2013 |

BATTERY CASE AND METHOD OF PRODUCTION OF SAME

FIELD

The present invention relates to a battery case comprised of a container body and a container cover, in particular relates to a battery case wherein one or both of the container body and the container cover is comprised of a film-laminated steel sheet, the film-laminated steel sheet is joined together, and the joined part of the container and the container cover thereby has a welded part of the steel sheet, a gap part, and a melt bonded part of the film and the inside surface of the battery case is covered by the film.

BACKGROUND

As cases of storage batteries and capacitors and other storage devices, mainly two types are widely known: ones of types using metal sheet materials which are pressed, wound, laser welded, etc. to thereby form cylindrical shaped or rectangular barrels and ones of pouch types comprised of resin films having metal foil as gas barrier layers and heat sealed parts heat sealing these to form cases (in this case, since they are soft, also referred to as "bag members"). Note that, in this Description, unless otherwise particularly indicated, "heat sealing" means the action of melt bonding and solidifying a resin by heat, while "heat sealed part" mean a portion where the resin is melt bonded and solidified by heat sealing. Further, in this Description, unless otherwise particularly indicated. "welding" means to join by a metal material while "melt bonding (heat sealing)" means to join by a resin material.

A pouch type battery is used in a state isolating the storage device part from the outside world by wrapping it by a metal foil on which a heat seal resin is laminated (laminated metal foil) and heat sealing a heat sealing resin part together to form a heat sealed part. This is because leakage of the electrolyte of the battery to the outside or entry of water vapor from the environment would critically shorten the service life of the battery.

However, in the case of past battery cells with laminated metal foil joined by only heat sealing, the heat sealed part formed a path for leakage of electrolyte inside of the batteries or a path for entry of water vapor etc. from the outside environment to the inside etc. so the length of the heat sealed part became a factor determining the service life of the battery cell. For this reason, to extend the service life of a battery, it is effective to increase the length of the heat sealed part, but on the other hand, if increasing the length of the heat sealed part, the amount of wasted space increases and the cell volume per space becomes smaller. Therefore, in a battery cell of a laminated pack joined by heat sealing, there is a tradeoff between the cell volume per unit space and the service life of the battery.

Note that, up until now, as the laminated metal foil used for pouch type battery cases, laminated aluminum foil has been used. This is related to the feature of aluminum of ease of obtaining thin metal foil and to the fact that pouch type cases evolved from the plastic pouches used for food packaging. That is, in food packaging pouches, aluminum had been vapor deposited as a barrier layer to impart a gas barrier property for extending the shelf life of food. If applying this as a light weight battery container able to be easily joined by heat sealing, in particular in a lithium ion battery using a nonaqueous electrolyte etc., a much tougher gas barrier property than with food is demanded, so it is necessary to improve the reliability of the gas barrier layer. For this reason, the thickness of the aluminum of the gas barrier layer was increased. This led to the application of aluminum foil from an aluminum vapor deposited film.

For example, PTL 1 (Japanese Unexamined Patent Publication No. 2010-086744) discloses a sheath member sealing and holding a lithium ion battery body, capacitor, electrical double-layer capacitor, or other electrochemical cell bodies and discloses, as a packaging material for the battery sheath, an electrochemical cell-use packaging material comprised of at least a base layer, a metal foil layer with a chemically treated surface, an acid-modified polyolefin layer, and a heat bondable resin layer successively stacked together." Here, simply, the "base layer" is a resin film. Even with just such an expression, it will be understood that the metal foil layer plays a secondary role. In fact, even in the Description, it is stated that "the metal foil layer 12 is a layer for preventing water vapor from penetrating inside of the lithium ion battery from the outside", but in PTL 1, the metal foil layer 12 is not welded together. The resin layer is heat sealed to obtain the sealability of the battery.

PTL 2 discloses as a sheath for battery use excellent in barrier property a sheath for battery use comprised of a first resin film, a vapor deposited metal layer, an electroconductive coating film layer, a metal plating layer, and a second resin film stacked together. This sheath for battery use is described as being thin and excellent in barrier property. However, in PTL 2, the metal plating layer is not welded. The resin film is heat sealed to seal the battery.

PTL 3 discloses, as an example of a battery case of a type using a metal sheet material which is press formed, wound, laser welded, etc. to form a cylindrical shaped or rectangular shaped barrel, a battery container comprised of a sheet material having a steel sheet and a metal plating layer covering both of the surfaces. In PTL 3, as a rust preventer, a resin material with a high corrosion resistance is coated to prevent progression of rust or other corrosion. However, the resin is not heat sealed: the air-tightness of the container is obtained by crimping the sheet material.

PTL 4 discloses a resin-metal composite sealed container having a joined part realizing a high gas barrier property. More specifically, it discloses a resin-metal composite sealed container comprised of a container obtained by sealing an end face of laminated metal foil by heat sealing and further having at the outside from the heat sealed part of the end face a sealed part sealing the metal by a weld bead.

Batteries are being asked to be made further smaller in size, longer in service life, lower in cost, etc. To realize this, various research and development are underway on battery containers.

CITATION LIST

Patent Literature

[PTL 1] Japanese Unexamined Patent Publication No. 2010-086744
[PTL 2] Japanese Unexamined Patent Publication No. 2004-342564
[PTL 3] Japanese Unexamined Patent Publication No. 2011-060644
[PTL 4] WO2013/132673

SUMMARY

Technical Problem

In a laminated type lithium ion battery, to seal the container, a heat sealed part obtained by hot melt bonding (heat sealing) a resin material is often employed. However, at a heat sealed part, the sealability is sometimes not sufficient resulting in water vapor in the atmosphere penetrating inside the battery and causing the battery to degrade. That is, with just a heat sealed part, sometimes the performance will easily progressively deteriorate with long term use.

Sealing by welding a metal foil or metal sheet promises improved sealability compared with sealing by heat sealing. However, if using a laser etc. to weld a resin-laminated foil, generally, the laminated foil has a foil thickness of the same extent as the resin (film) thickness, so sometimes the resin (film) and the foil are melt bonded mixed together. For this reason, if not causing the resin (film) to sufficiently vaporize by the laser etc., the metal foil cannot be welded. Therefore, to weld the metal foil, a step of removing the resin (film) becomes necessary. This easily leads to an increase in the work load and cost at the time of production. Further, a battery expands and contracts inside at the time of charging and discharging. While repeatedly being charged and discharged, breakage easily occurs at the welded part of the resin-laminated foil (the foil is welded, so the strength is not enough).

If welding a resin-laminated steel sheet, the heat when welding the steel sheet is conveyed to the outside of the welded part as well. The resin (film) other than at the welded part becomes thinner and the underlying steel sheet sometimes easily becomes exposed after the welding. Due to this, the corrosion resistance falls and the performance easily becomes increasingly degraded with long term use.

Further, if using a resin-laminated foil and trying to realize both melt bonding, that is, heat sealing, of the resin and welding of the foil, when welding by a laser etc., the metal foil deforms due to the heat, so heat sealing has to be performed before the welding. That is, the heat sealing process and the welding process have to be performed as separate processes. This easily leads to a rise in the work load or cost at the time of production.

As explained above, in a battery container, stable maintenance of performance over a long period (longer service life) and suppression of the work load and cost at the time of production (lower cost) have been sought. Furthermore, to raise the battery capacity, reduction of the size of battery containers and the ability to efficiently mount them (mountability) have also been sought. In view of these situations, the present invention has as its object the provision of a battery case realizing smaller size, higher mountability, longer service life, and lower cost compared with the past.

Solution to Problem

The inventors of the present application engaged in intensive studies and obtained the following findings leading to the completion of the present invention.

At the present time, among batteries like lithium ion batteries which use nonaqueous electrolytes as electrolytes, there are some which use laminated type containers in which Al or SUS materials laminated with a resin are hot melt bonded. On the other hand, in the case of rectangular batteries etc., rectangular containers obtained by laser welding Al or SUS materials are being used.

(I) If heat sealing containers by hot melt bonding of a resin, sometimes the water vapor in the atmosphere penetrates into the battery from the melt bonded part (heat sealed part) of resin films with each other, so compared with welding, the performance is easily degraded with long term use, but instead of heat sealing a resin, it is possible to weld the steel sheet (metal material) to raise the sealability (air tightness) thereby leading to longer service life. Further, the welded part of a steel sheet gives a higher weld strength than a welded part of metal foil. Further, a container comprised of steel sheet is generally higher in rigidity compared with one comprised of metal foil. Further, the joined part (region including welded part of steel sheet, melt bonded part of film, and gap part between the same) is small, so the container can be made smaller in size and in turn the mountability can be improved.

(II) Due to the heat affect at the time of welding by a laser etc., the resin films of laminated steel sheet can be melt bonded (heat sealed). In this case, a heat sealed part is also formed along with the welded part, so a strong joined part is formed and, furthermore, the sealability can also be raised. Further, the heat sealing process and the welding process do not have to be performed as separate processes so the work load and cost can be decreased at the time of production.

(III) When the resin film softens and resolidifies due to the heat affect at the time of welding by a laser etc., a gap part is sometimes formed. The gap part only naturally does not melt bond and does not improve the joint strength. Further, gas produced by heat decomposition of the resin film easily collects in the gap part. After that, the gas expands etc. due to the weld heat etc. from the surroundings. Due to this, the resin film or welded part around the gap part is liable to be damaged thereby leading to a shorter service life. Furthermore, the larger the gap part, the larger the joining force by the welded part or the melt bonded part has to be made. This makes reduction of the size of the container difficult.

On the other hand, there are also advantages obtained due to the existence of the gap part. A battery generates heat due to charging and discharging at the time of utilization of the battery. If not used, the temperature returns to room temperature. In this cycle, the battery container and the laminated steel sheet forming the same repeatedly expand and contract. At this time, the laminate resin deforms causing stress at the melt bonded part (heat sealed part) and sometimes leading to the melt bonded resin parts peeling apart. In such a case, if there is a gap part, the deformed part of the resin can be absorbed by the gap part, the stress acting on the melt bonded part (heat sealed part) falls, peeling can be suppressed, and a longer service life can be led to.

(IV) The inventors discovered that by prescribing the length of the gap part by the relationship with the steel sheet thickness etc., it is possible to alleviate the disadvantages due to the gap part to an extent where they no longer pose a problem and possible to keep the melt bonded part (heat sealed part) from peeling apart.

According to the present invention, the following are provided.

[1] A battery case comprised of a container body and a container cover,
in which battery case,
either or both of the container body and the container cover are comprised of a laminated steel sheet comprised of a plated steel sheet on which a film having a polyolefin-based resin as a main constituent is laminated,
a joined part of the container body and the container cover has a welded part of the plated steel sheet, a melt bonded part of the film, and a gap part between the welded part and the melt bonded part, where.
a length of the gap part/a thickness of the plated steel sheet ≤10.0 and
a length of the gap part/a length of the joined part <0.50, and at least part of the inside surface of the battery case is covered by the film.

[2] The battery case according to [1], wherein a length of the joined part including the welded part and the melt bonded part is 8.0 mm or less and a gap part at the joined part is 2.00 mm or less.

[3] The battery case according to [1] or [2], wherein a thickness of the laminated steel sheet is 0.15 mm or more and 1.00 mm or less.

[4] The battery case according to any one of [1] to [3], wherein a plating used for the plated steel sheet includes one or more types of elements from among Al, Cr, Ni, Sn, and Zn.

[5] The battery case according to any one of [1] to [4], wherein the joined part including the welded part and the melt bonded part is approximately parallel with a bottom surface of the container body.

[6] The battery case according to any one of [1] to [5], wherein the shape is rectangular and a shortest side of a height, width, and depth is 10.0 mm or more.

[7] The battery case according to any one of [1] to [6], wherein the container cover is comprised of SUS, Al, a laminated SUS, or a laminated Al.

[8] A method for producing the battery case according to any one of [1] to [7], which method for producing a battery case comprising superposing sheet members forming the container body and the container cover and heating the superposed location to form the joined part.

Advantageous Effects of Invention

According to these aspects of the present invention, a battery case and a method of production of the same by which a drop in joint strength, peeling of a melt bonded part (heat sealed part) due to pooling of gas, obstruction of reduction of size, lower mountability, etc. are resolved and in which smaller size, higher mountability, longer service life, and lower cost than in the past are realized.

DESCRIPTION OF EMBODIMENTS

Figure 1:
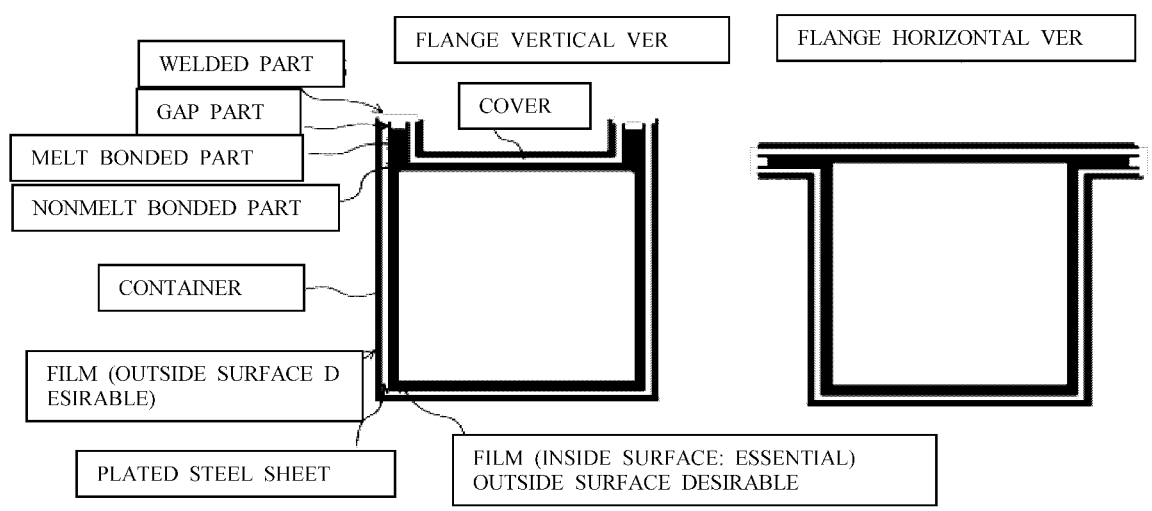
FIG. 1 is a schematic view of a battery case of one aspect of the present invention.

FIG. 1 is a schematic view of a battery case of one aspect of the present invention. The battery case is comprised of a container body and a container cover joined together. Further, one or both of the container body and the container cover are comprised of a laminated steel sheet comprised of a plated steel sheet on which a film having a polyolefin-based resin as a main constituent is laminated. At the inside of the battery case, a cell comprised of an anode, cathode, and separator and an electrolyte are sealed whereby a battery can be formed.

Figure 2:
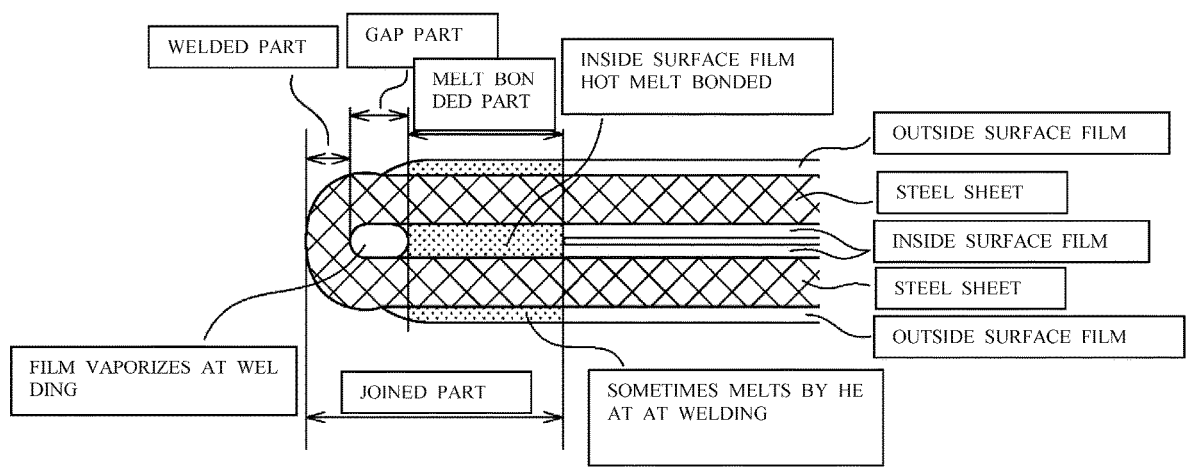
FIG. 2 is an enlarged schematic view of a joined part of FIG. 1.

FIG. 2 is an enlarged schematic view of a joined part of FIG. 1. The joined part is a region including a welded part, a melt bonded part, and a gap part between the two. Note that, in this Description, unless particularly indicated otherwise, "welding" refers to joining by a metal material while "melt bonding" refers to joining by a resin material. Since at least one of the container body and the container cover is comprised of a resin-laminated steel sheet, welding is realized by the plated steel sheet contained in the resin-laminated steel sheet and melt bonding is realized by the resin contained in the resin-laminated steel sheet.

The melt bonded part is formed by the resin melting due to heat and then solidifying and is also called a "heat sealed part". A melt bonded part (heat sealed part) is not comprised of a metal and is joined by only the resin. Its gas barrier property is lower compared with the metal layer or a welded part comprised of metal. In particular, penetration by water vapor has a critical impact on service life. For this reason, in a battery in which a high gas barrier property is demanded, there is the problem that with joining by just a melt bonded part, a sufficient gas barrier property cannot be secured. However, the joined part according to one aspect of the present invention has a welded part in addition to a melt bonded part. At a portion which is welded, a gas barrier is formed by the metal, so at a welded part, compared with a resin melt bonded part, penetration of water vapor from the outside and leakage of electrolyte to the outside can be reduced to a negligible extent. This has the remarkable effect of enabling a broad increase in service life.

Note that, welding is realized by a heat source such as a laser. This heat not only welds the plated steel sheet, but is also conveyed to the surrounding resin film whereby melt bonding of part of the resin film is also realized. That is, the welding process using a laser etc. also serves as the melt bonding process. This leads to a lighter work load and lower costs.

If heating a resin-laminated steel sheet by a laser etc. for welding, heat is conveyed from the heated location. The closer to the heated part, the higher the temperature becomes while the further from the heated part, the lower the temperature becomes. Depending on the temperature, the polyolefin-based resin of the main constituent of the film melts or vaporizes. At a location where the resin melts, a melt bonded part is formed. On the other hand, at a location where the resin vaporizes, a gap part is formed. In a location where the resin has vaporized, the plated steel sheet is exposed. At the heated part and particularly high temperature locations in its vicinity, a welded part of the plated steel sheet is formed. At a location separated a certain amount from the heated location, the temperature becomes higher than the vaporization temperature of the polyolefin-based resin and lower than the melting point of the plated steel sheet, so only a gap part remains there. Furthermore, at a location separated from the heated location, the temperature becomes lower than the vaporization temperature of the polyolefin-based resin and higher than the melting point of the polyolefin-based resin, so a melt bonded part is formed.

Therefore, the joined part according to one aspect of the present invention has a gap part between the welded part and melt bonded part such as shown in FIG. 2. The gap part, only naturally, is neither welded nor melt bonded and does not improve the joint strength. Further, gas produced by heat decomposition of the resin film easily collects in the gap part. Later, due to the weld heat etc. from the surroundings, the gas expands etc. threatening to cause defects in the resin film or welded part near the gap part. Furthermore, the larger the gap part, the larger the strength of the joined part by the welded part or melt bonded part has to be made, the more difficult reduction of size of the container becomes, and the more the mountability is lowered. For this reason, making the gap part as small as possible is advantageous in terms of smaller size, mountability, and longer service life.

However, there are also advantages obtained due to the presence of the gap part. A battery container is usually set in a restrained space so as to keep down expansion and contraction due to the active substance at the time of charging and discharging. Further, in resin-laminated steel sheets, if the thicknesses of the resin are the same, ones with greater thicknesses of the steel sheets become larger in amounts of change of volume of the steel sheets due to heat expansion and become larger in rates of change of volume of the resin accompanying the steel sheets. A battery generates heat due to charging and discharging at the time of battery use and returns in temperature to room temperature if not being used. In this cycle, the container and the laminated steel sheet forming the same repeatedly expand and contract. At this time, expansion of the resin itself and expansion of the steel sheet cause the resin to be pressed, so the resin deforms. Due to this deformation, stress is applied to the resin, in particular the melt bonded part (heat sealed part), and the melt bonded resin parts sometimes peel apart. More specifically, at the melt bonded part (heat sealed part), there is an end at the gap part side and an end at the non-gap part side, but at the non-gap part side, the heat at the time of laser welding is not sufficiently conveyed, so there is a part where the bonding strength between the parts of the film is low. For this reason, if expansion and contraction of the resin occur due to heat, the resin parts will easily peel apart from the end of the melt bonded part at the non-gap part side. In such a case, if there is a gap part, the deformed part of the resin can be absorbed by the gap part, the stress applied to the melt bonded part (heat sealed part) falls, peeling can be suppressed, and in turn a longer service life can be led to.

The battery case of one aspect of the present invention satisfies the following relationship:

Length of gap part/thickness of plated steel sheet≤10.0  (1)

Length of gap part/length of joined part<0.50  (2)

The gap part corresponds to a location where part of the resin film has melted and vaporized. For this reason, regarding the size of the gap part, the height (distance in vertical cross-sectional direction) is, even at the maximum, about the thickness of the resin film, but the length (distance in horizontal cross-sectional direction) changes depending on the state of conduction of heat for welding. In general, the larger the amount of heat input or the longer the heat input time, the longer the length.

The inventors engaged in intensive studies and as a result discovered that the length of the gap part can change depending on the thickness of the plated steel sheet.

Even if, like in PTL 4, using metal foil laminated with a resin, welding the metal foil requires that the resin laminated on the metal foil be removed. However, the resin film and the metal foil are the same extents of thicknesses. For this reason, with the heat input for welding the metal foil, a considerably broad range of the resin film melts and vaporizes. For this reason, the gap part easily becomes larger. Further, with the heat input for welding the metal foil, the laminate resin simultaneously vaporizes. Due to the vaporized gas of the resin, the melted metal foil is sometimes also blown off (so-called explosion). Note that, PTL 4, to avoid such explosion, selects the materials so that the melting point of the metal forming the metal foil becomes higher than the heat decomposition temperature of the resin by a certain extent. The further apart the melting point of the metal and the decomposition temperature of the resin, the more the resin decomposes and gas is generated. It is surmised in PTL 4 that the decomposition gas of the resin which causes explosions can be sufficiently dispersed before the metal melts due to the large time lag until the metal melts. Further, in PTL 4, welding is separately performed after the laminate resin is heat sealed.

As opposed to this, in one aspect of the present invention, instead of metal foil, a resin-laminated plated steel sheet comprised of a plated steel sheet on which a resin is laminated is used. A plated steel sheet is larger in thickness than a metal foil and larger in heat capacity as well. Further, in general, between a resin and metal (steel sheet), a metal is higher in heat conductivity. For this reason, even if inputting heat for welding a resin-laminated plated steel sheet, the range of melting and vaporization of the resin film can be made considerably smaller than with a resin-laminated metal foil. That is, the gap part can be made relatively smaller and the length of the gap part can be shortened as well. Similarly, the range by which the resin film is melt bonded (heat sealed) can also be made considerably smaller than a resin-laminated metal foil. That is, the melt bonded part (heat sealed part) can be made relatively smaller and the length of the melt bonded part can also be shortened.

Further, overall, a plated steel sheet is larger in thickness that a metal foil, so is higher in rigidity. Therefore, a container made from a plated steel sheet can be mounted superposed in several layers compared with a container made from metal foil, that is, can be raised in mountability. Lithium ion batteries and other batteries are usually used mounted together, but when the area allowed for mounting is limited, it would be advantageous to enable a greater number of batteries to be mounted. Specifically, in passenger cars and other general use industrial products, while based on the specifications and technical standards, there are also demands from the viewpoint of design, so the mounting spaces for batteries are usually determined for each product. It would be advantageous to be able to efficiently mount batteries in such variously determined mounting spaces. For this reason, it is possible to judge the level of mountability by whether batteries (battery containers) can be stably mounted without sticking out from the mounting space while satisfying the desired amount of electric power. In one aspect of the present invention, it is possible and advantageous to increase the mountability by making the container higher in rigidity and shaping it corresponding to the mounting space. Further, since plated steel sheet is greater in thickness than metal foil, the strength of the welded part is high. In a battery, the inside of the battery expands and contracts at the time of charging and discharging. With repeated charging and discharging, with a welded part of resin-laminated foil, breakage easily occurs (since foil is welded, the strength is not sufficient), but with a welded part of steel sheet, the strength is high and breakage does not easily occur.

Note that, if mounting a plurality of battery containers at a predetermined position (for example, in automobiles etc., sometimes a plurality of battery containers are mounted), the battery containers may be stacked in the vertical direction or may be aligned in the horizontal direction. Further, they may be both vertically stacked and horizontally aligned in combination. In any case, if mounting the same number of battery containers, the smaller the space required for mounting, the more effectively limited space can be utilized. In one aspect of the present invention, the length of the gap part can be shortened, so the space required for mounting can be made smaller advantageously. On the other hand, as explained above, due to the presence of the gap part, a melt bonded part can be kept from peeling apart.

In one aspect of the present invention, steel sheet, which is relatively thicker than foil etc., is employed, so the length of the gap part becomes relatively short. Conversely speaking, the gap part length and thickness of the plated steel sheet satisfy the following relationship:

$$\text{Length of gap part/thickness of plated steel sheet} \leq 10.0 \quad (1)$$

If this ratio is 10.0 or less, the plated steel sheet becomes relatively thick. In other words, the length of the gap part becomes relatively short and the above-mentioned problems (drop in joint strength, peeling of melt bonded part (heat sealed part) due to pooling of gas, obstruction of reduction of size, lower mountability, etc.) are resolved. From the viewpoint of these problems, the smaller the ratio, the better. The length of gap part/thickness of plated steel sheet may be ≤1.0 as well. The lower limit value is not particularly prescribed, but so long as there is a gap part, the ratio is more than 0, so the length of gap part/thickness of plated steel sheet may also be >0. Due to the presence of the gap part, the welded part and the melt bonded part are physically separated and resin can be prevented from penetrating to the welded part. Further, as explained above, due to the presence of the gap part, the melt bonded part can be kept from peeling apart.

On the other hand, if the ratio exceeds 10.0, the plated steel sheet becomes relatively thin. In other words, the length of the gap part becomes relatively greater and the above-mentioned problems easily arise.

Here, the thickness of the plated steel sheet may also change. As one example, even if the starting steel sheet thickness is constant, the thickness may change at the flange, walls, and bottom due to drawing operations etc. If the thickness of the plated steel sheet changes, the average value of the thickness of the plated steel sheet at the joined part may be used as the thickness of the plated steel sheet in the above formula (1).

Further, by making the plated steel sheet to be welded thinner, it is possible to perform the welding quickly. Further, by making the thickness of the steel sheet relatively thinner at the location for melt bonding the resin film, it is possible to promote conveyance of heat to the resin film to promote melt bonding of the resin. Instead of changing the thickness of the plated steel sheet to control the input heat or in addition to that, it is also possible to give such a heat absorbing action to the fixtures used at the time of welding. More particularly, the fixtures may be water cooled inside them. Further, to control the length of the heat sealed part or to control the shape of the heat sealed part, fixtures of Cu, Al, Fe, etc. with different heat conductivities may be used. The fixtures may also be ones partially combining the above.

The length of the gap part becomes relatively shorter (compared with case of resin-laminated metal foil), so the ratio of the length of the gap part to the length of the joined part (welded part+gap part+melt bonded part) also becomes smaller. In one aspect of the present invention, the following formula is satisfied.

$$\text{Length of gap part/length of joined part} < 0.50 \quad (2)$$

If this ratio is less than 0.50, the length of the gap part becomes relatively large compared with the joined part and the problems due to the gap part (drop in joint strength, peeling of melt bonded part (heat sealed part) due to pooling of gas, obstruction of reduction of size, lower mountability, etc.) are resolved. From the viewpoint of these problems, the smaller the ratio, the better. The length of gap part/length of joined part may be 0.20 as well. The lower limit value is not particularly prescribed, but so long as there is a gap part, the ratio is more than 0, so the length of gap part/length of joined part may also be >0. Due to the presence of the gap part, the welded part and the melt bonded part are physically separated and resin can be prevented from penetrating to the welded part. Further, as explained above, due to the presence of the gap part, the melt bonded part can be kept from peeling apart.

On the other hand, if this ratio is 0.50 or more, the length of the gap part becomes relatively large compared with the joined part and problems due to the gap part (drop in joint strength, peeling of melt bonded part (heat sealed part) due to pooling of gas, obstruction of reduction of size, lower mountability, etc.) easily occur.

The length of the gap part at the joined part may also be 2.00 mm or less. From the viewpoint of eliminating the problems due to the gap part (drop in joint strength, peeling of melt bonded part (heat sealed part) due to pooling of gas, obstruction of reduction of size, lower mountability, etc.), in particular from the viewpoint of realizing a reduction of size of the battery case and higher mountability, the smaller the gap part, the better. That is, the shorter the length of the gap part, the better. Preferably, the length is 1.00 mm or less, more preferably is 0.50 mm or less.

On the other hand, as explained above, due to the presence of the gap part, the melt bonded part can be kept from peeling apart. From this viewpoint, the lower limit of the length of the gap part may be made 0.10 mm or more, more preferably 0.30 mm or more.

Further, if the length of the gap part is more than 2.00 mm, the length of the gap part becomes relatively large compared with the joined part and the problems due to the gap part (drop in joint strength, peeling of melt bonded part (heat sealed part) due to pooling of gas, obstruction of reduction of size, lower mountability, etc.) easily arise. In particular, reduction of the size of the battery case and high mountability become difficult.

The length of the joined part may be 8.0 mm or less. From the viewpoint of realization of reduction of size of the battery case and high mountability, the shorter the length of the joined part, the better. Preferably the length may be 5.0 mm or less, more preferably 3.0 mm or less and 2.0 mm or less.

If the length of the joined part is more than 8.0 mm, the length of the joined part is large and reduction of the size of the battery case and high mountability sometimes become difficult.

The thickness of the resin-laminated plated steel sheet may be 0.15 mm or more and 1.00 mm or less. If the plated steel sheet is thin, there is not enough metal for forming the weld metal, weld defects more easily occur, the metal more easily deforms, and control of the welding sometimes becomes difficult. On the other hand, if too thick, the weight of the container inherently increases, so this is sometimes disadvantageous from the viewpoint of lightening the weight.

Further, the thickness of the laminate resin for melt bonding (heat sealing) use is preferably 10 to 200 μm, more preferably 15 to 100 μm. If the laminate resin is thin, there is too little resin melt bonded at the time of heat sealing and defects in the melt bonded part (defects of seal with no resin) sometimes start to arise. On the other hand, if too thick, a large amount of decomposition gas is produced at the time of welding, the gap part easily becomes larger, and the parts of the plated steel sheet to be welded together become hard to weld together.

The length of the melt bonded part (heat sealed part) may be 0.4 mm or more and 2.4 mm or less. From the viewpoint of realizing a reduction of size and high mountability of the battery case, the shorter the joined part the better. The melt bonded part is included in the joined part, so the shorter the length of the melt bonded part the better. However, if the length of the melt bonded part is 0.4 mm or less, the melt bonded part will sometimes more easily peel apart. Further, if the melt bonded part is short, defects easily occur in the melt bonded part. Defects of the melt bonded part become paths for electrolyte to the welded part (iron). After that, at the welded part, corrosion occurs due to the electrolyte. Furthermore, electrolyte reaches the welded part (iron) through the corroded locations resulting in more easier corrosion there as well. Further, if the length of the melt bonded part is 2.4 mm or more, the length of the joined part becomes larger and reduction of size of the battery case and high mountability sometimes become difficult.

The plating used at the resin-laminated plated steel sheet may be suitably selected within a range not affecting the welding of the plated steel sheet or the melt bonding of the laminate resin. The type of the plating may be selected in accordance with the electrolyte of the battery, the usage environment, etc. so that a suitable corrosion resistance is obtained. The plating used in the plated steel sheet may include one or more types of elements from among Al, Cr, Ni, Sn. and Zn. Platings including these elements can be obtained by ordinary methods. In platings including a plurality of elements, the plating elements may be plated in one or more forms among alloy layers, lamellar shapes, or partial granular partial lamellar shapes. From the viewpoints of corrosion resistance, ease of acquisition, etc., the platings may be tin-free steel having a chromium oxide layer and metal chromium layer or various nickel platings having nickel layers or nickel layers and nickel-iron alloy layers.

The amount of plating may be suitably selected in accordance with the electrolyte of the battery, the usage environment, etc. so that a suitable corrosion resistance is obtained. The amount may be a range from 5 mg/m$^2$ to 30 g/m$^2$. If 5 mg/m$^2$ or less, the plating cannot be deposited over the entire surface and the resistance to electrolyte adhesion easily falls. If 30 g/m$^2$ or more, at the time of being worked, cracks form in the plating and sometimes become the cause of a drop in the peel strength etc.

Note that, with plating, there can be several types of plating baths, but performance is secured regardless of the plating bath. Further, the plating method may be one other than electroplating as well such as thermal spraying, vapor deposition, or hot dip coating.

The steel sheet used for the resin-laminated plated steel sheet may be suitably selected in a range not causing problems in plateability, weldability, or melt bonding of the laminate resin. The type of the steel sheet may be selected in accordance with the electrolyte of the battery, the usage environment, etc. so that a suitable corrosion resistance is obtained. Corrosion resistance or container strength can be secured by the thickness of the steel sheet, so steel sheet with a good cost performance can also be employed. As the steel sheet, in addition to stainless steel, pure iron, carbon steel, low alloy steel, etc. may also be employed.

The resin used for the resin-laminated plated steel sheet is a polyolefin-based resin. A polyolefin-based resin is also suitable as a heat seal resin. Further, it can also serve as the resin of the inside surface of the battery case. In one aspect of the present invention, at least part of the inside surface of the battery case is covered by a film of the same.

The polyolefin-based resin of the joined part including the welded part and the melt bonded part is a resin comprised of a resin having repeating units of the following (formula 1) as its main constituent. "Main constituent" means the resin having repeating units of the (formula 1) comprises 50 mass % or more.

$$—CR^1H—CR^2R^3—\qquad\text{(formula 1)}$$

(in which formula 1, $R^1$ and $R^2$ respectively indicate a C1 to C12 alkyl group or hydrogen and $R^3$ indicates a C1 to C12 alkyl group, aryl group, or hydrogen)

A polyolefin-based resin may be a homopolymer of the above-mentioned constitutional units or may be a copolymer of two or more types. Five or more of the repeating units are preferably chemically bonded. If less than five, the polymer effects (for example, flexibility, stretchability, etc.) sometimes become hard to manifest.

If illustrating the above repeating units, repeating units appearing when addition polymerizing terminal olefins such as ethylene, propene (propylene), 1-butene, 1-pentene, 4-methyl-1-pentene, 1-hexene, 1-octene, 1-decene, and 1-dodecene, repeating units when adding isobutene, and other aliphatic olefins or styrene monomers and in addition o-methylstyrene, m-methylstyrene, p-methylstyrene, o-ethylstyrene, m-ethylstyrene, o-ethylstyrene, o-t-butylstyrene, m-t-butylstyrene, p-t-butylstyrene, and other alkylated styrenes, monochlorostyrene and other halogenated styrenes, end methylstyrene and other styrene-based monomer addition polymer units and other aromatic olefins etc. may be mentioned.

If illustrating homopolymers of such repeating units, the homopolymers of terminal olefins such as low density polyethylene, medium density polyethylene, high density polyethylene, linear low density polyethylene, cross-linkable polyethylene, polypropylene, polybutene, polypentene, polyhexene, polyoctenylene, polysoprene, polybutadiene, etc. may be mentioned. Further, if illustrating copolymers of such repeating units, an ethylene-propylene copolymer, ethylene-butene copolymer, ethylene-propylene-hexadiene copolymer, ethylene-propylene-5-ethylidene-2-norbornene copolymer, or other aliphatic polyolefin or styrene-based copolymer or other aromatic polyolefin etc. may be mentioned, but the invention is not limited to these. It is sufficient that the above repeating units be satisfied. Further, the copolymer may be a block copolymer or may be a random copolymer. Further, these resins may be used alone or as two types or more mixed.

Further, the polyolefin used in the present invention need only have the above polyolefin units as a main constituent. Substituents of the above units such as a vinyl monomer, polar vinyl monomer, or diene monomer may also be copolymerized in monomer units or resin units. As the copolymer compositions, they are 50 mass % or less, preferably 30 mass % or less, with respect to the above olefin units. If more than 50 mass %, the barrier property with respect to corrosion causing substances and other properties of the olefin-based resin sometimes fall.

As examples of the above polar vinyl monomer, acrylic acid, methyl acrylate, ethyl acrylate, and other acrylic acid derivatives, methacrylic acid, methyl methacrylate, ethyl methacrylate, and other methacrylic acid derivatives, acrylonitrile, maleic anhydride, imide derivatives of maleic anhydride, vinyl chloride, etc. may be mentioned.

Most preferable from handling ability and the barrier property against corrosion causing substances are low density polyethylene, medium density polyethylene, high density polyethylene, linear low density polyethylene, cross-linkable polyethylene, polypropylene, or mixtures of two or more of the same.

As the laminate resin used in the present invention (heat seal resin), these polyolefin-based resins are generally preferable, but industrially, a resin mainly comprised of polyethylene or polypropylene is more preferable from the viewpoints of costs, distribution, ease of hot lamination, etc.

Here, "a resin mainly comprised of polypropylene" means a resin containing polypropylene in 50 mass % or more. In addition to pure polypropylene resin, resins obtained by polymerization of a total of less than 50 mass % by ratio of low density polyethylene or high density polyethylene or other various types of polyethylene with polybutene, polypentene, and other polyolefins etc. may be mentioned. Further, for improving the adhesion with the plated steel sheet, it may also be made an acid-modified polyolefin. It may be a block copolymer or a random copolymer. Further, there may be one type or two or more types of olefins in addition to the polypropylene polymerized with. It is sufficient that the main polypropylene be present in 50 mass % or more. More preferably, it is one from 70 mass % or more or 90 mass % or more of polypropylene to polypropylene itself. Preferably, what is polymerized is something lowered in decomposition temperature from the time of the polypropylene alone. A polyethylene-based resin is particularly preferable.

The resin-laminated plated steel sheet used in the present invention container may have a surface at the side not covered by the heat seal resin, that is, the surface at the side usually becoming the outside surface of the container, which is left as the surface of the plated steel sheet itself or is treated to form oxide or covered by plating or coated by various resin laminates. In particular, when a coating thinner than the heat seal resin is applied, there is no effect on the welding and insulation ability, heat radiation ability, and other functions are given, so a laminated plated steel sheet covered on its outer surface side is also within the scope of the present invention. In particular, covering the outside surface by a 20 μm or less or a further 12 μm or less thickness PET film to impart an insulation ability is preferable from the viewpoints of economy, handling, workability, etc.

Further, the melt bonding (heat seal) resin at the inside surface of the battery container does not have to be a single layer. A polypropylene layer acid-modified to improve the adhesion with the metal may be laminated at the side contacting the plated steel sheet, a polypropylene layer improving the heat sealability may be laminated at the outside layer, and otherwise several layers of resin laminate may be coated.

Furthermore, the inside surface side of the battery container can be improved in electrolyte resistance by treating the surface of the plated steel sheet. Electrolytic chromate, resin chromate, or other various chromate treatments or other chromate-free treatments may be applied. Note that tin-free steel, which is already given a chromate surface treatment as a finished product, has excellent electrolyte resistance equal to a metal surface given various chromate treatments. As the method of chemical treatment, the following may be used. Before the chemical treatment, the surface may be descaled as priming. As descaling methods, pickling, sandblasting, grit blasting, etc. may be mentioned. If illustrating the chemical treatment methods, chromate treatment, chromate-free treatment not using $Cr^{+6}$, strike plating, epoxy primer treatment, silane coupling treatment, titanium coupling treatment, etc. may be mentioned. Among these, priming by pickling and sandblasting, then chromate treatment or chromate-free treatment, strike plating, or epoxy primer treatment is preferable from the viewpoint of strengthening the chemical adhesion between the resin composition and the plated steel sheet.

The position of the joined part including the welded part and melt bonded part is not particularly limited, but considering the efficiency of the welding work, reduction of wasted material, etc., the end parts of the container body and the container cover are preferably welded.

Further, the direction of orientation of the joined part including the welded part and melt bonded part is not particularly limited. The joined part may be approximately parallel with the bottom part of the container body (or the container cover). In this embodiment, the opening part of the container body may be made a flange structure and the flange part and outer edge part of the container cover may be superposed and welded making the welding work more efficient. Further, such a joined part sticks out from the side barrel part of the container body in this embodiment, but the length of the joined part according to the present invention is limited to a predetermined ratio with respect to the steel sheet thickness, so the extent of projection is slight. For this reason, even if aligning several containers, the problem of the joined parts interfering with each other and lowering the mountability will hardly ever arise.

On the other hand, the joined part may also be approximately parallel with the side barrel part of the container body (in other words, approximately vertical to the bottom part of the container body (or the container cover)). This state may be realized by adjusting the inside edge dimension of the opening part of the container body and the outside diameter dimension of the container cover so that the container cover fits into the container body. This joined part does not stick out from the side barrel part of the container body (in other words, runs along the side barrel part). Even if aligning several containers, the problem of the joined parts interfering with each other and lowering the mountability will not arise.

Note that, "approximately parallel (approximately vertical)" means within several degrees, for example, within ±5 degrees, more preferably within ±3 degrees, in range with respect to the parallel (vertical) direction.

The shape and size of the battery case can be suitably selected in accordance with the application etc. The battery case may be a rectangular shape or a cylindrical shape. Note that, a rectangular shape is superior to a cylindrical shape in heat radiation ability, so is considered to be easier to make larger, more economical, and better in mountability, so is preferable.

The shortest side of the battery case among the height, width, and depth may be 10.0 mm or more. By the shortest side being 10.0 mm or more, the inside volume of the battery case can be made larger (on the other hand, by making the gap part smaller, the rate of occupancy of the effective space can also be raised). For this reason, when making the battery modular, it is possible to reduce the number of batteries required and easy to assemble the modules.

The container cover forming part of the battery case may be made from a stainless steel sheet, aluminum sheet, a laminated stainless steel sheet, or a laminated aluminum sheet. These materials are being broadly employed in relation to the electrolyte in current lithium ion batteries. In the battery case of one aspect of the present invention as well, these proven materials can be used.

A battery case is formed by joining a container body and container cover. Sheet materials for forming the container body and the container cover are superposed on each other and the superposed locations are heated by a laser etc. whereby they are joined and a joined part is formed. To eliminate waste of the material, the end parts of the container body and the container cover are preferably joined with each other.

The closer to the part heated by a laser etc., the higher the temperature while the further from the heated part, the lower the temperature. Depending on the temperature, the metal of the plated steel sheet will melt and the polyolefin-based resin of the main constituent of the film will melt or vaporize. For this reason, at the heated part and locations of a particularly high temperature near the same, a welded part of the plated steel sheet will be formed. At a location separated from the heated location by a certain extent, the temperature becomes higher than the vaporization temperature of the polyolefin-based resin and lower than the melting point of the plated steel sheet, so only a gap part remains there. Furthermore, at a location separated from the heated location, the temperature becomes lower than the vaporization temperature of the polyolefin-based resin and higher than the melting point of the polyolefin-based resin, so a melt bonded part is formed. In other words, the heat sealing process and the welding process do not have to be performed as separate processes, so the work load at the time of manufacture and the cost can be reduced.

Note that, if the gas generated due to vaporization of the resin remains in the gap part, it sometimes will become a cause of weld defects. Therefore, it is preferable to design the weld location so that gas will not remain at the gap part, that is, so that the gas easily escapes. In the case of flange welding, the flange is preferably made to face upward. Further, by blowing Ar or another inert gas at the welded location at the time of welding, the welded part can be kept from being oxidized and the gas produced due to vaporization of the resin can be made to disperse more so that flammable gas does not remain at the gap part. Due to this, a longer service life can be expected.

Welding and melt bonding occur due to heating. The heat source is not particularly limited. A laser, electron beam, etc. can be used. The input energy, scan speed, etc. can be suitably adjusted in accordance with the material to be joined.

The method of laser welding may be a known method. For example, a $CO_2$ gas laser or a semiconductor laser etc. may be used as the energy source. Further, a laser beam passed through a fiber, a laser beam converged by a lens, or a laser beam reflected using a reflector may also be used.

Figure 3:
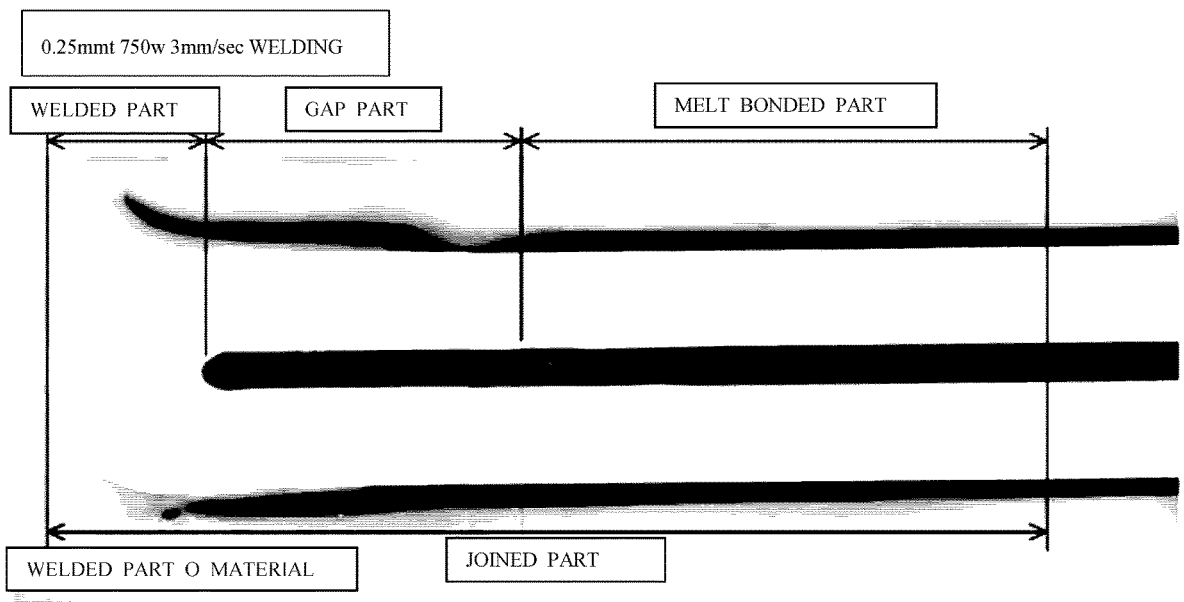
FIG. 3 is a photograph showing one example of a joined part.

FIG. 3 shows a photo of a cross-section of a location where a container body and container cover were actually joined by laser heating. Two sheets of a metal material, upper and lower (reflecting light, so appearing white) are welded together at their side end face parts. Inside of the laser welded part (right direction of photo), melt bonded (heat sealed) resin is visible. A gap part is visible between the welded part and the melt bonded part. Note that, the gap part is filled with a resin burying it for taking a photo.

EXAMPLES

The present invention will be explained using the following examples. However, the present invention should not be construed as being limited to these examples.

A container body and container cover comprised of each of the materials of the conditions shown in Table 1 was prepared. The container body was provided with a flange parallel to the bottom part of the container body at the opening part of the container body. The flange part and the outer edge part of the container cover were superposed and joined by laser heating to thereby prepare a battery case. The outside dimensions of the battery case were 26.5×148.0× 91.0 mm. The laser emission conditions were suitably selected within the ranges shown in Table 2 in accordance with the material being irradiated.

Note that, as the base material of the laminated steel sheet, 0.12 to 0.25 mm thick TFS was used.

Further, as the plating conditions, Cr plating was performed by electrolytic Cr plating. The Cr plating bath used was a Sargent Bath containing chromic acid: 250 g/liter and sulfuric acid: 3 g/liter. As the electrolysis conditions, a plating bath temperature of 50° C. and a current density of 30 $A/dm^2$ were used.

The Ni plating was performed by electrolytic Ni plating. The Ni plating bath used was a strike bath containing nickel chloride: 240 g/liter and hydrochloric acid: 125 g/liter. As the electrolysis conditions, a pH of 1.0 to 1.5, a plating bath temperature of 25° C., and a current density of 4 $A/dm^2$ were used.

The Zn plating was performed by electrolytic Zn plating. The Zn plating bath used was a bath containing $ZnSO_4$: 200 g/liter, $H_2SO_4$: 15 g/liter, and $NaSO_4$: 45 g/liter. As the electrolysis conditions, a pH of 1 to 2.5, a plating bath temperature of 50° C., and a current density of 30 $A/dm^2$ were used.

The Sn plating was performed by electrolytic Sn plating. The Sn plating bath used was a bath containing $SnSO_4$: 36 g/liter and p-phenolsulfonic acid: 115 g/liter. As the electrolysis conditions, a pH of 1.0 to 1.5, a plating bath temperature of 25° C., and a current density of 4 $A/dm^2$ were used. As the electrolysis conditions, a plating bath temperature of 45° C. and a current density of 30 $A/dm^2$ were used.

The Al plating was performed by vacuum vapor deposition by resistance heating. The heating temperature was made 900° C. and the vacuum degree was made $10^{-3}$ Pa.

The above platings were performed so that the amounts of deposition became 100 $mg/m^2$.

As the chemical conversion, the following chromate treatment was performed:

The chromate treatment used an ordinary temperature bath comprised of anhydrous chromic acid: 25 g/liter, sulfuric acid: 3 g/liter, and nitric acid: 4 g/liter to which phosphoric acid, hydrochloric acid, ammonium fluoride, etc. were suitably added to thereby form a chromate treated layer by a cathode current density of 25 $A/dm^2$. If increasing the basis weight of the chromate treatment, with a treatment time of 20 seconds, an approximately 15 nm chromate treatment layer was formed.

The method of measurement of the thickness was direct measurement of the thickness of the chromate treated layer by XPS analysis (Quantum 2000 made by PHI, X-ray source: AlKα (1486.7 eV), monochromatic, X-ray output: 15 kV, 1.6 mA).

TABLE 1

| | No. | Material of container | Plating type/ Material of chemical conversion | (Sheet thickness of container (nm) | Material of film Inside surface/ outside surface | Film thickness (μm) Inside surface | Film thickness (μm) Back surface | Gap length (mm) | Gap/ sheet thickness | Joined part length (mm) | Gap/ joined part |
|---|---|---|---|---|---|---|---|---|---|---|---|
| Same materials | 1 | Lam. steel sheet | Cr | 0.12 | PP/PET | 20 | 12 | 0.37 | 3.1 | 2.4 | 0.15 |
| | 2 | Lam. steel sheet | Cr | 0.12 | PP/PET | 40 | 12 | 0.35 | 2.9 | 2.5 | 0.14 |
| | 3 | Lam. steel sheet | Cr | 0.12 | PP/PET | 60 | 12 | 0.32 | 2.7 | 2.6 | 0.12 |
| | 4 | Lam. steel sheet | Cr | 0.18 | PP/PET | 20 | 12 | 0.42 | 2.3 | 2.3 | 0.18 |
| | 5 | Lam. steel sheet | Cr | 0.18 | PP/PET | 40 | 12 | 0.40 | 2.2 | 2.4 | 0.17 |
| | 6 | Lam. steel sheet | Cr | 0.18 | PP/PET | 60 | 12 | 0.39 | 2.2 | 2.4 | 0.17 |
| | 7 | Lam. steel sheet | Cr | 0.20 | PP/PET | 40 | 12 | 0.54 | 2.7 | 2.3 | 0.23 |
| | 8 | Lam. steel sheet | Cr | 0.25 | PP/PET | 20 | 12 | 0.75 | 3.0 | 2.2 | 0.34 |
| | 9 | Lam. steel sheet | Cr | 0.25 | PP/PET | 40 | 12 | 0.72 | 2.9 | 2.3 | 0.31 |
| | 41 | Lam. steel sheet | Cr | 0.25 | PP/PET | 40 | 12 | 0.72 | 2.9 | 2.3 | 0.31 |
| | 10 | Lam. steel sheet | Cr | 0.25 | PP/PET | 60 | 12 | 0.73 | 2.9 | 2.4 | 0.30 |
| | 11 | Lam. steel sheet | Cr | 0.25 | PP/PET | 80 | 12 | 0.70 | 2.8 | 2.6 | 0.27 |
| | 12 | Lam. steel sheet | Cr | 0.50 | PP/PET | 20 | 12 | 0.77 | 1.5 | 2.1 | 0.37 |
| | 13 | Lam. steel sheet | Cr | 0.50 | PP/PET | 40 | 12 | 0.80 | 1.6 | 2.2 | 0.36 |
| | 14 | Lam. steel sheet | Cr | 0.50 | PP/PET | 60 | 12 | 0.82 | 1.6 | 2.4 | 0.34 |
| | 15 | Lam. steel sheet | Cr | 0.70 | PP/PET | 20 | 12 | 0.91 | 1.3 | 2.1 | 0.43 |
| | 16 | Lam. steel sheet | Cr | 0.70 | PP/PET | 40 | 12 | 0.93 | 1.3 | 2.1 | 0.44 |
| | 17 | Lam. steel sheet | Cr | 0.70 | PP/PET | 60 | 12 | 0.87 | 1.2 | 2.2 | 0.40 |
| | 18 | Lam. steel sheet | Cr | 1.00 | PP/PET | 20 | 12 | 1.20 | 1.2 | 2.6 | 0.46 |
| | 19 | Lam. steel sheet | Cr | 1.00 | PP/PET | 40 | 12 | 1.10 | 1.1 | 2.4 | 0.46 |
| | 20 | Lam. steel sheet | Cr | 1.00 | PP/PET | 60 | 12 | 1.10 | 1.1 | 2.7 | 0.41 |
| | B | Lam. steel sheet | Cr | 0.18 | PP/PET | 5 | 12 | 0.94 | 5.2 | 2.8 | 0.34 |
| | C | Lam. steel sheet | Cr | 0.18 | PP/PET | 10 | 12 | 0.71 | 3.9 | 2.53 | 0.28 |
| | D | Lam. steel sheet | Cr | 1 | PP/PET | 230 | 12 | 0.47 | 0.5 | 1.5 | 0.31 |
| | E | Lam. steel sheet | Cr | 0.4 | PP/PET | 190 | 12 | 0.53 | 1.3 | 2.2 | 0.24 |
| | F | Lam. steel sheet | Cr | 0.3 | PP/PET | 10 | 12 | 1.92 | 6.4 | 4.28 | 0.45 |
| | G | Lam. steel sheet | Cr | 0.16 | PP/PET | 10 | 12 | 1.34 | 8.4 | 3.21 | 0.42 |
| | H | Lam. steel sheet | Cr | 0.14 | PP/PET | 10 | 12 | 1.38 | 9.9 | 3.42 | 0.40 |
| | I | Lam. steel sheet | Cr/Ni(Ni: 29 g/m2) | 0.2 | PP/PET | 40 | 12 | 0.51 | 2.6 | 2.5 | 0.20 |
| Different materials | 21 | Lam. steel sheet | Cr | 0.50 | PP/PET | 40 | 12 | 0.80 | 1.6 | 2.2 | 0.36 |
| | 22 | Lam. steel sheet | Cr | 0.50 | PP/PET | 40 | 12 | 1.10 | 2.2 | 2.6 | 0.42 |
| | 23 | Lam. SUS | Chem. conv. | 0.50 | PP/PET | 40 | 12 | 0.90 | 1.8 | 2.4 | 0.38 |
| | 24 | Lam. Al | Chem. conv. | 0.50 | PP/PET | 40 | 12 | 1.20 | 2.4 | 2.5 | 0.48 |

TABLE 1-continued

| | No. | Material of cover | Plating type | Sheet thickness (mm) | Material of film Inside/outside surface | Film thickness Inside (μm) | Film thickness Back (μm) | | | | |
|---|---|---|---|---|---|---|---|---|---|---|---|
| Non-laminated Al, SUS | 25 | Lam. steel sheet | Cr | 0.30 | PP/PET | 40 | 12 | 0.75 | 2.5 | 2.5 | 0.30 |
| | 26 | Lam. steel sheet | Cr | 0.30 | PP/PET However, both front and back PP have modified PP layers | 40 | 12 | 0.80 | 2.7 | 2.3 | 0.35 |
| Sheet thickness | 27 | Lam. steel sheet | Cr | 0.50 | PP/PET | 40 | 12 | 0.61 | 6.1 | 2.4 | 0.25 |
| | 28 | Lam. steel sheet | Cr | 0.70 | PP/PET | 40 | 12 | 0.85 | 4.3 | 2.3 | 0.37 |
| | 2.9 | Lam. steel sheet | Cr | 0.30 | PP/PET | 40 | 12 | 0.77 | 2.6 | 2.3 | 0.33 |
| | 30 | Lam. steel sheet | Cr | 0.30 | PP/PET | 40 | 12 | 0.84 | 2.8 | 2.2 | 0.37 |
| Plating type | 31 | Lam. steel sheet | Cr/Ni | 0.20 | PP/PET | 40 | 12 | 0.51 | 2.6 | 2.3 | 0.22 |
| | 32 | Lam. steel sheet | Cr/Sn | 0.20 | PP/PET | 40 | 12 | 0.54 | 2.7 | 2.5 | 0.22 |
| | 33 | Lam. steel sheet | Cr/Zn | 0.20 | PP/PET | 40 | 12 | 0.56 | 2.8 | 2.4 | 0.24 |
| | 34 | Lam. steel sheet | Cr/Al | 0.20 | PP/PET | 40 | 12 | 0.51 | 2.6 | 2.5 | 0.21 |
| Comp. ex. (Scalability, conditions) | 35 | Lam. copper foil | Cr | 0.08 | PP/PET | 40 | 12 | — | — | — | — |
| | 36 | SUS foil | Chem. conv. | 0.08 | PP/PET | 40 | 12 | — | — | — | — |
| | 37 | SUS foil | Chem. conv. | 0.10 | PP/PET | 40 | 12 | 2.60 | 26.0 | 5.0 | 0.52 |
| | 38 | Al foil | Chem. conv. | 0.08 | PP/PET | 40 | 12 | — | — | — | — |
| | A | SUS foil | Chem. conv. | 0.08 | PP/PET | 40 | 12 | 0 | — | 6.2 | — |
| | 39 | Lam. steel sheet | Cr | 0.11 | PP/PET | 20 | 12 | 1.20 | 10.9 | 2.7 | 0.44 |
| | 40 | Lam. steel sheet | Cr | 0.95 | PP/PET | 20 | 12 | 1.40 | 1.5 | 2.2 | 0.64 |

| | | Lid | | | | | | | | |
|---|---|---|---|---|---|---|---|---|---|---|
| | | Melt bonded part length (mm) | Material of cover | Plating type/ chemical conversion | Sheet thickness of cover (mm) | Material of film Inside surface/ outside surface | Film thickness (μm) | | Evaluation | | |
| | No. | | | | | | Inside surface | Back surface | Scalability | Mountability | Life |
| Same materials | 1 | 2.33 | | Same as container | | Same as container | | | G | G | G |
| | 2 | 2.02 | Same as container | | | Same as container | | | G | G | G |
| | 3 | 2.12 | Same as container | | | Same as container | | | G | G | G |
| | 4 | 1.72 | Same as container | | | Same as container | | | G | G | V |
| | 5 | 1.55 | Same as container | | | Same as container | | | G | G | V |
| | 6 | 1.62 | Same as container | | | Same as container | | | G | G | V |
| | 7 | 1.45 | Same as container | | | Same as container | | | G | G | V |
| | 8 | 1.50 | Same as container | | | Same as container | | | G | | V |
| | 9 | 1.43 | Same as container | | | Same as container | | | G | G | V |
| | 41 | 1.52 | Same as container | | | Same as container | | | G | G (vert.) | V |
| | 10 | 1.38 | Same as container | | | Same as container | | | G | G | V |
| | 11 | 1.26 | Same as container | | | Same as container | | | G | G | V |
| | 12 | 0.96 | Same as container | | | Same as container | | | G | G | V |
| | 13 | 0.89 | Same as container | | | Same as container | | | G | G | V |
| | 14 | 0.84 | Same as container | | | Same as container | | | G | G | V |

TABLE 1-continued

| | | | | | | | | | | |
|---|---|---|---|---|---|---|---|---|---|---|
| | 15 | 0.65 | Same as container | | | Same as container | | G | G | V |
| | 16 | 0.57 | Same as container | | | Same as container | | G | G | V |
| | 17 | 0.54 | Same as container | | | Same as container | | G | G | V |
| | 18 | 0.45 | Same as container | | | Same as container | | G | G | V |
| | 19 | 0.46 | Same as container | | | Same as container | | G | G | V |
| | 20 | 0.46 | Same as container | | | Same as container | | G | G | V |
| | B | 1.62 | Same as container | | | Same as container | | G | G | G |
| | C | 1.54 | Same as container | | | Same as container | | G | G | V |
| | D | 0.39 | Same as container | | | Same as container | | G | G | G |
| | E | 1.2 | Same as container | | | Same as container | | G | G | V |
| | F | 2.04 | Same as container | | | Same as container | | G | G | V |
| | G | 1.64 | Same as container | | | Same as container | | G | G | V |
| | H | 1.58 | Same as container | | | Same as container | | G | G | V |
| | I | 1.79 | Same as container | | | Same as container | | G | G | V |
| Different materials | 21 | 0.83 | Lam. SUS | Chromate | 0.5 | Same as container | | G | G | V |
| | 22 | 0.92 | Lam. Al | Chromate | 0.5 | Same as container | | G | G | V |
| | 23 | 0.87 | Lam. steel sheet | Cr | 0.5 | Same as container | | G | G | V |
| | 24 | 0.98 | Lam. steel sheet | Cr | 0.5 | Same as container | | G | G | V |
| Non-laminated Al, SUS | 25 | 1.46 | Al | Chromate | Same as container | None | — | G | G | G |
| | 26 | 1.21 | SUS | Chromate | Same as container | None | — | G | G | G |
| Sheet thickness | 27 | 1.42 | Cr plated lam. | | 0.1 | Same as container | | G | G | V |
| | 28 | 1.28 | Cr plated lam. | | 0.2 | Same as container | | G | G | V |
| | 2.9 | 1.32 | Cr plated lam. | | 0.5 | Same as container | | G | G | V |
| | 30 | 0.72 | Cr plated lam. | | 0.7 | Same as container | | G | G | V |
| Plating type | 31 | 1.43 | | Same as container | | Same as container | | G | G | V |
| | 32 | 1.48 | Same as container | | | Same as container | | G | G | V |
| | 33 | 1.49 | Same as container | | | Same as container | | G | G | V |
| | 34 | 1.50 | Same as container | | | Same as container | | G | G | V |
| Comp. ex. (Scalability, conditions) | 35 | — | Same as container | | | Same as container | | B | B | B |
| | 36 | — | Same as container | | | Same as container | | B | B | B |
| | 37 | 2.42 | Same as container | | | Same as container | | B | B | B |
| | 38 | | | | | Same as container | | B | B | B |
| | A | 6.20 | Same as container | | | Same as container | | G | B | B |
| | 39 | 1.41 | Same as container | | | Same as container | | B | G | G |
| | 40 | 0.60 | Same as container | | | Same as container | | G | B | V |

B: Bad,
G: Good,
V: Very good

Each obtained battery case as evaluated for sealability, mountability, and length of service life. The results are described in Table 1. Details of the evaluations were as follows:

Sealability

Electrolyte was filled into the container up to 1/3 of its height, then the container was turned upside down and held at 80° C. for 2 hours so that the welded part was sufficiently contacted by the solution. Cases where there was no leakage of electrolyte from the container were evaluated as good (G) and cases where there was leakage from the container were evaluated as bad (B).

Mountability

Twenty-eight of the prepared battery cases were aligned in the horizontal direction so as to adjoin each other with the 26.5 mm×148.0 mm surfaces as bottom surfaces. Cases where the occupied area required for mounting the 28 battery cases was of a level enabling mounting without problem in a reference area (area occupied by battery in current general passenger cars) were evaluated as good (G) while cases where the batteries could not be mounted due to interference of the flange parts etc. were evaluated as bad (B).

Further, at No. 41, it was also confirmed that a plurality of battery cases can be stacked in the vertical direction using the 26.5 mm×148.0 mm surfaces (vertical stacking)

Length of Service Life (Suppression of Peeling of Melt Bonded Part Due to Gap Part)

Each prepared battery case was used to run a heating and cooling cycle test.

The heating and cooling cycle test was conducted by holding the case at 80° C. temperature for 1 hour, then holding it at 20° C. temperature for 1 hour as one cycle. This test was conducted for 150 cycles then the state of the joined part, in particular the melt bonded part, was examined in cross-section.

When the original melt bonded part length was defined as 1, a case where the rate of reduction of the melt bonded part length after the end of the cycle test was 5% or less was evaluated as very good (V), a case where the rate of reduction was more than 5% and 15% or less was evaluated as good (G), and a case where the rate of reduction was more than 15% was evaluated as bad (B).

The melt bonded part length was found by examining the bonded part prepared by burial in resin and polishing by an optical microscope. The end parts of the melt bonded part were examined under a 500× power to check they were melt bonded (whether they peeled apart). The length of the joined part as a whole sometimes changes, so the measurement was conducted while suitably adjusting the observation power to match it. Observation samples (joined parts) were cut out from the battery case prepared under the same conditions at three locations each before and after the cycle test and were evaluated by the average values obtained w % ben measuring the lengths of the gap parts and melt bonded parts included in the joined parts.

Cases which satisfied the scope of the present invention in the length of the gap part/thickness of the plated steel sheet and the length of the gap part/length of the joined part gave good sealability, mountability, and length of service life (sealability and mountability were good (G) and length of service life was good (G) or very good (V)).

In Nos. 35 to 38 and A, not laminated plated steel sheets, but laminated metal foils were used. In Nos. 35, 36, and 38, the above heating (same as examples) was performed, but good welding was not possible. In No. 37, after heat sealing, the end parts were welded and a joined part could be formed, but the gap part became relatively bigger. Further, if first performing only heat sealing (if not performing heat sealing simultaneously with welding), it is necessary to perform the heat sealing over a relatively broad range so that the strength and sealability of the heat sealed part are sufficiently obtained. That is, the melt bonded part became relatively large. In No. A, the metal foil was joined only by heat sealing, that is, was not welded and there was no gap part either. For this reason, in Nos. 35 to 38 and A, at least one of the sealability, mountability, and length of service life was poor.

No. 39 had a length of gap part/thickness of plated steel sheet of more than 10 and was poor in sealability. No. 40 had a length of gap part/length of joined part of more than 0.5 and was poor in mountability.

Separately, for some test samples, containers provide with flanges extending vertically with respect to the container bodies were prepared. Among these containers as well, it was possible to satisfy the scope of the present invention in the length of gap part/thickness of plated steel sheet and the length of gap part/length of joined part and good sealability, mountability, and length of service life were obtained (the sealability and mountability were good (G) and the length of service life was good (G) or very good (V)). In particular, there was no interference between flanges among adjoining containers, so the mountability could be further improved.

TABLE 2

Table 2. Laser Emission Conditions

| Apparatus | 1000 W semiconductor laser (HighLight 1000F made by Coherent Co., Ltd,) |
|---|---|
| Wavelength | 975 nm |
| Focal point size | φ 0.3 mm to 1.8 mm |
| Assist gas | Ar 10 to 50 liter/min. φ 4 to 12 mm |
| Weld posture | Horizontal direction |
| Laser scan speed - output | 3 mm to 100 mm/sec, 100 to 2000 W |
| Cooling fixture | Laminated steel plate laser welded while sandwiched by Cu fixtures from above and below (due to fixtures, melt bonded part can be shortened) |

The invention claimed is:

1. A battery case comprised of a container body and a container cover, wherein,
    one or both of the container body and the container cover are made from a laminated steel sheet comprised of a plated steel sheet on which a film having a polyolefin-based resin as a main constituent is laminated,
    a joined part of the container body and the container cover has a welded part of the plated steel sheet, a melt bonded part of the film, and a gap part between the welded part and the melt bonded part,
    a ratio of the length of the gap part to the thickness of the plated steel sheet is ≤10.0,
    a ratio of the length of the gap part to the length of the joined part is <0.50,
    at least part of the inside surface of the battery case is covered by the film, and
    a thickness of the plated steel sheet is 0.18 mm or more, and 1.00 mm or less.

2. The battery case according to claim 1, wherein a length of the joined part including the welded part and the melt bonded part is 8.0 mm or less and the gap part in the joined part is 2.00 mm or less.

3. The battery case according to claim 2, wherein a thickness of the laminated steel sheet is 1.00 mm or less.

4. The battery case according to claim 2, wherein a plating used for the plated steel sheet includes one or more types of elements from among Al, Cr, Ni, Sn, and Zn.

5. The battery case according to claim 2, wherein the joined part including the welded part and the melt bonded part is approximately parallel with a bottom surface of the container body.

6. The battery case according to claim 2, having a rectangular shape in which a shortest side of a height, width, and depth is 10.0 mm or more.

7. The battery case according to claim 2, wherein the container cover is comprised of SUS, Al, a laminated SUS, or a laminated Al.

8. The battery case according to claim 1, wherein a thickness of the laminated steel sheet is 1.00 mm or less.

9. The battery case according to claim 8, wherein a plating used for the plated steel sheet includes one or more types of elements from among Al, Cr, Ni, Sn, and Zn.

10. The battery case according to claim 8, wherein the joined part including the welded part and the melt bonded part is approximately parallel with a bottom surface of the container body.

11. The battery case according to claim 8, having a rectangular shape in which a shortest side of a height, width, and depth is 10.0 mm or more.

12. The battery case according to claim 1, wherein a plating used for the plated steel sheet includes one or more types of elements from among Al, Cr, Ni, Sn, and Zn.

13. The battery case according to claim 12, wherein the joined part including the welded part and the melt bonded part is approximately parallel with a bottom surface of the container body.

14. The battery case according to claim 12, having a rectangular shape in which a shortest side of a height, width, and depth is 10.0 mm or more.

15. The battery case according to claim 1, wherein the joined part including the welded part and the melt bonded part is approximately parallel with a bottom surface of the container body.

16. The battery case according to claim 15, having a rectangular shape in which a shortest side of a height, width, and depth is 10.0 mm or more.

17. The battery case according to claim 1, having a rectangular shape in which a shortest side of a height, width, and depth is 10.0 mm or more.

18. The battery case according to claim 1, wherein the container cover is comprised of SUS, Al, a laminated SUS, or a laminated Al.

19. A method for producing the battery case according to claim 1, which method for producing a battery case comprising superposing sheet members forming the container body and the container cover and heating the superposed location to form the joined part.

* * * * *